Feb. 12, 1935.  C. E. HATHORN  1,990,990
CONTROL LEVER AND SHAFTING
Filed Feb. 9, 1933
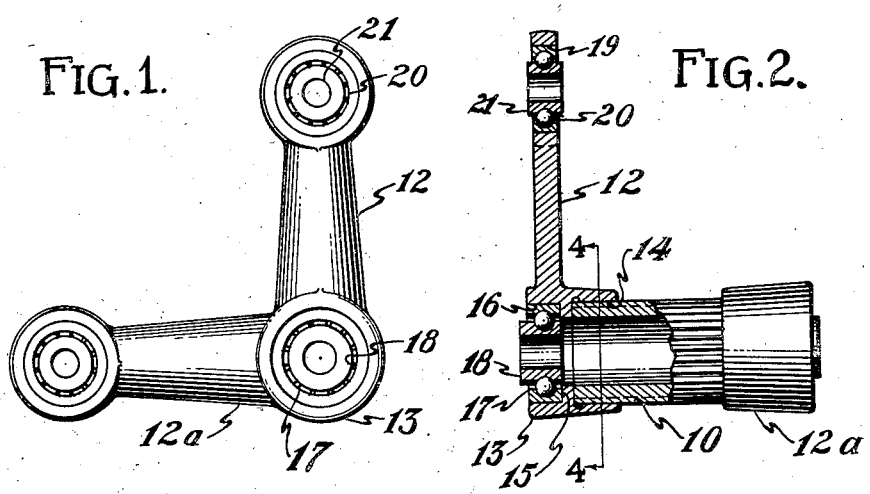
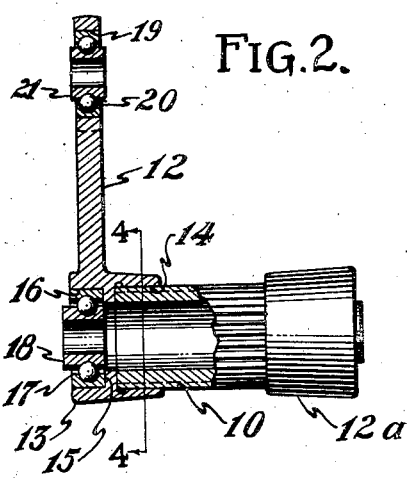
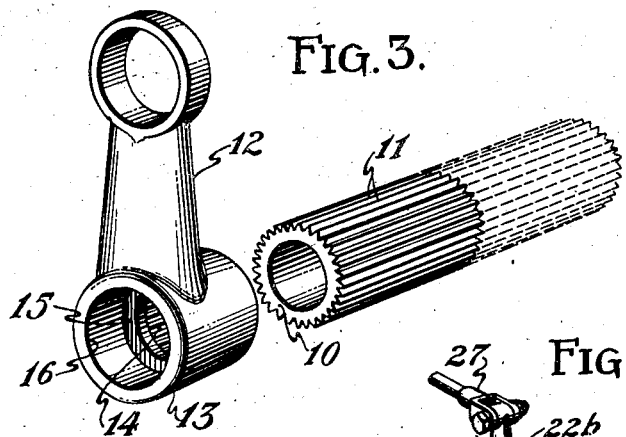
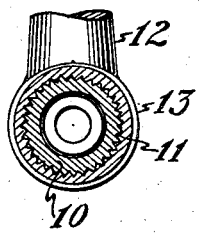
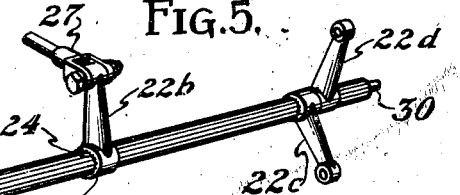
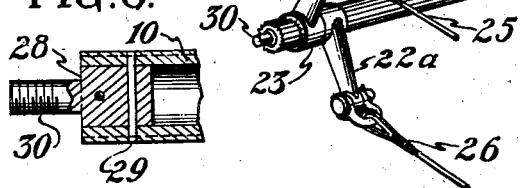
INVENTOR.
CHARLES E. HATHORN.
BY
ATTORNEYS.

Patented Feb. 12, 1935

1,990,990

UNITED STATES PATENT OFFICE 1,990,990

CONTROL LEVER AND SHAFTING

Charles E. Hathorn, Hempstead, N. Y., assignor to Curtiss Aeroplane & Motor Company, Inc., a corporation of New York Application February 9, 1933, Serial No. 655,945

4 Claims. (Cl. 64—29)

This invention relates to control parts, and more particularly to interchangeable control levers and shafting adapted to be used in connection with aircraft. Control levers and shafting are used with many kinds of mechanisms—the devices represented by this invention are adapted to be used in any such application. However, the devices herein shown and described find particular adaptability in control mechanism for aircraft, such as engine control and the like.

It is frequently necessary to use an intermediate jack shaft having levers placed therealong, the ends of the levers being connected to various parts to be operated. One such lever is normally connected to a control handle available to the operator. By the placement of the devices to be controlled, certain of the levers on the shaft must frequently be at an angle to other levers, the angle being somewhat indeterminate except upon assembly of the parts. In the past, it has been customary to use as a shaft, a round steel tube, and to use levers, slipped over the shaft, which are drilled and pinned to the shaft upon assembly. The pin in such assembly is peened over. Hence, when disassembling such a unit, it is necessary to knock out the pins, and the mechanic must go to a considerable amount of detail work in order to reassemble them in their proper relation.

It is an object of this invention to provide a splined jack shaft and operating levers adapted to be placed upon such shaft in any convenient angular location, without the necessity of drilling or pinning the levers to the shaft.

A further object of the invention is to provide for the complete interchangeability of the levers on splined shafting.

Still another object is to provide a splined shaft and levers, as articles of manufacture, the splined shaft being adapted to be cut to any desired length for the apparatus in which it is to be used.

A further object is to provide bearing means whereby the shaft may be carried for rotation with respect to a fixed part of the apparatus on which it is installed.

Still another object is to provide an alternative form of lever which not only is adapted to be slipped over the splined shaft in any desired angular relation, but is also adapted to carry pivoting means whereby the shaft may be supported in fixed relation to the apparatus.

Further objects will be apparent from a reading of the subjoined specification and claims, and from a consideration of the drawing, in which:

Fig. 1 is an end elevation of a pair of levers assembled on the shaft;

Fig. 2 is a side elevation, partly in section, of Fig. 1;

Fig. 3 is a perspective of part of the units comprising the assembly of Figs. 1 and 2;

Fig. 4 is a section on the line 4—4 of Fig. 2;

Fig. 5 is a perspective of an alternative embodiment of the invention; and

Fig. 6 is an enlarged detail section of part of Fig. 5.

In the drawing, similar numbers indicate similar parts.

Referring to Figs. 1 to 4, inclusive, a shaft 10, shown in the form of a tube, is provided with a plurality of contiguous, similar, and longitudinally extending external splines 11. Such shafting 10 may be fabricated in any convenient length and may be cut to the length required for the installation in view, still retaining all of the spline characteristics of the shaft. Levers 12 and 12a may be assembled on either end of the shaft 10, these levers being identical in their construction. A description of the details of the lever 12 will also serve to describe the details of the lever 12a. The lever 12 is provided at one end with a boss 13 having an opening 14 having internal splines complementary to the splines 11 extending approximately half the length of the boss. Intermediate the ends of the boss 13, a shoulder 15 serves as an abutment against which the shaft 10 may be pressed to limit the extent of its insertion within the opening 14. Opposite the shoulder 15, and extending inwardly from the opposite end of the boss 13, is formed an opening 16 adapted to receive a bearing 17 having an inner race 18 adapted to be mounted upon a suitable fixed shaft (not shown) rigidly attached to the apparatus on which the whole assembly may be mounted.

The outer end of the lever 12 is provided with an opening 19 adapted to receive a small ball bearing 20, the inner race 21 of which may be slipped over the clevis or shackle pin of an operating arm (not shown).

The lever 12a may be placed upon the opposite end of the shaft 10 in any desired angular relation to the lever 12, by virtue of the similarity and frequency of the splines 11 formed on the shaft 10. The lever 12a also provides for the pivoting of the assembly of the shaft 10 with the levers 12 and 12a.

An alternative arrangement is shown in Figs. 5 and 6, wherein levers 22, 22a, 22b, 22c and 22d have through splined openings 24 formed within their bosses 23. In this embodiment, the plurality of levers 22 may be slipped over the shaft, each of which may be set in angular relation to the others, by virtue of the plurality of splines 11 on the shaft 10. Suitable operating connections 25, 26 and 27 may be arranged at the outer ends of the levers 22.

For carrying this embodiment of the shaft 10 in pivoting relation to apparatus, shouldered cylindrical plugs 28 may be inserted in the ends of the shaft 10, such plugs being fixed to said shaft as by pins 29. The outer extending end 30 of the plug 28 is of a diameter adapted to be carried in a suitable bearing (not shown) fixed to the supporting apparatus.

It will be readily seen that a great degree of flexibility in the adjustment of the control levers is afforded by the construction above described, and it may also be readily seen that the assembly of a plurality of levers on a shaft may be effected by the use of standardized parts which inherently cannot turn with respect to the mounting shaft and which, therefore, may be assembled with a minimum of time and effort, obviating any requirement for pinning or keying the levers to the shaft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. As a new article of manufacture, the combination of an externally longitudinally splined cylindrical member adapted to be cut to lengths convenient for use, a lever having an internally splined shouldered opening within which an end of said member is adapted to be inserted, the splines of said member engaging the splines of said opening and the end of said member abutting against said shoulder, and a bearing carried by said lever, concentric with said opening, on which said member and said lever, when in assembled relation, are adapted to be carried for rotation.

2. An operating lever for use in combination with a cylindrical member of uniform cross section throughout its length, comprising a hub from which an arm extends, said hub having an opening for receiving an end of said member, a shoulder formed within said hub against which said member is adapted to abut, and bearing means carried by said hub, on the axis of which said lever and said member when in assembled relation are adapted to rotate.

3. An operating lever for use in combination with a cylindrical member, comprising a hub from which an arm extends, said hub having an axial opening for receiving an end of said cylindrical member, a shoulder in said hub opening against which said member is adapted to abut, said hub having a recess on the opposite side of said shoulder from said opening, said recess being axially aligned with said opening, and a bearing race within said recess for providing a bearing on which said lever and said member may rotate when in assembled relation.

4. In combination, a cylindrical member and an operating lever adapted to form an end for said member, said lever having an opening within which an end of said member is adapted to be inserted, and bearing means carried by said lever, axially aligned with said member, about which said lever and member may rotate when in assembled relation.

CHARLES E. HATHORN.